United States Patent Office 2,884,430
Patented Apr. 28, 1959

2,884,430

EXTRACTION OF FREE ALIPHATIC ACID FROM ALUMINUM SOAP

Frederick Neil Baumgartner, Plainfield, N.J., assignor to Esso Research and Engineering Company, a corporation of Delaware No Drawing. Application October 22, 1956
Serial No. 617,663

8 Claims. (Cl. 260—414)

The present invention relates to a method of separating free aliphatic or fatty acids present in aluminum soap preparations. It is concerned with accomplishing the separation of the free acids by extraction with a selective solvent which can thus be used with a minimum decomposition or extraction of the soap which is to be reduced in free acid content. The preferred solvent now found for this purpose is anhydrous dimethylformamide.

The soaps for which the present invention is mainly to be utilized are the basic aluminum disoaps which are useful as thickeners in hydrocarbon and halogenated hydrocarbon liquids. These soaps are generally formed by reaction of an aluminum salt solution with an alkali metal soap of the organic acid in the presence of excess alkali.

The organic acids involved are usually aliphatic carboxylic acids having from 2 to 36 and preferably 7 to about 18 carbon atoms per molecule. The organic acids used include such as acetic, hexoic, caprylic, capric, lauric, oleic, myristic, palmitic, stearic, dimerized linoleic and cyclic aliphatic organic acids, such as naphthenic acids. The alkali metal soaps are prepared by saponification of the organic acids and the excess alkali or excess hydroxide is the amount of the alkali hydroxide in addition to that required for the saponification. Depending on the method of admixing the reactants, the control of the proportions and other factors in the formation of the aluminum soaps, there can be more or less free organic acid present in the final product. Also, depending on the storage stability and the kind of storage of the aluminum soaps there may be various amounts of free organic acid formed through decomposition of the aluminum soaps.

Efforts to remove the free organic acids from the aluminum soaps have failed in many instances because these soaps formed a gel or reacted with the solvents. Inaccurate and erratic results have been obtained in using solvents other than anhydrous dimethylformamide used in accordance with the present invention.

It has now been found that anhydrous dimethylformamide is an ideal solvent for extracting free organic acids from these aluminum soaps which form gels with hydrocarbon liquids and certain other organic liquids. The aluminum soaps are practically insoluble in the anhydrous dimethylformamide even on prolonged contact at ordinary temperatures, e.g. 15° to 40° C. The free organic acids which tend to be present with the aluminum soaps, on the other hand, are quite soluble in the anhydrous dimethylformamide. Furthermore, the anhydrous dimethylformamide is sufficiently water-soluble to make convenient the use of water in separating solvent from such extracted free organic acids which are water-insoluble. The use of this solvent avoids difficulties of phase separation.

Attempts have been made to use various oxygenated hydrocarbons and other known solvents for fatty acids to extract these acids from the soaps but the results were unsatisfactory. Typical test results for a series of alcohols are shown in the following table.

TABLE I

*Aluminum disoap (di-2-ethylhexoate) extraction*

[Soap sample, 2 g., extracted with 3 successive portions of 50 ml. each of solvent.]

WT. PERCENT FATTY ACID EXTRACTED (AS CAPRYLIC ACID)

| Solvent | Methyl Alcohol | Isopropyl Alcohol | n-Butyl Alcohol | t-Butyl Alcohol |
|---|---|---|---|---|
| 1st Extract | 5.9 | 2.3 | 13.1 | 3.1 |
| 2nd Extract | 5.6 | 1.8 | | 3.5 |
| 3rd Extract | 4.9 | 1.2 | | |

The results in Table I clearly show that the solvents react with soap to release free fatty acid and thus give undesired and unreliable results.

Cold isooctane was tried as a solvent but found to gel with many soap samples.

A solvent which appeared to have the most promise was secondary butyl alcohol, but it, too, gave the undesirable results as shown by comparison of extractions using anhydrous secondary butyl alcohol as against the use of anhydrous dimethylformamide given in the following table:

TABLE II

*Aluminum disoap (di-2-ethylhexoate) sample extracted with 4 successive portions (25 ml. each)*

[Soap Sample, 2 g.]

PERCENT FATTY ACID EXTRACTED (AS CAPRYLIC ACID)

| Solvent | Sec. Butyl Alcohol | Dimethylformamide (anhydrous) |
|---|---|---|
| 1st Extract | 1.3 | 1.1 |
| 2nd Extract | 0.8 | 0.1 |
| 3rd Extract | 0.6 | 0.0 |
| 4th Extract | 0.8 | 0.0 |

The above Table II indicates that the secondary butyl alcohol continues to extract more fatty acid in the third and fourth successive extractions, whereas all the free fatty acid had been extracted in two stages by the dimethylformamide. The additional amount of material extracted by the secondary butyl alcohol was acid formed by decomposition of the soap. The proportions of solvent were selected for convenience and are not critical; however, the proportion of solvent used can be controlled to obtain a desired degree of free organic acid removal.

In the following Table III, examples are given of extractions with anhydrous dimethylformamide in three successive portions applied to a wide variety of aluminum soaps.

TABLE III

*Wt. percent acid (as caprylic acid) based on original crude soap sample*

[Using 10 parts by wt. of solvent per 1 part by wt. of soap per extraction.]

| Soap Sample | Extract 1 | Extract 2 | Extract 3 |
|---|---|---|---|
| A | 3.6 | 0.10 | 0 |
| B | 1.3 | 0 | 0 |
| C | 0.15 | 0 | 0 |
| 1095.168 D | 2.3 | 0 | 0 |
| 1095.210 E | 1.1 | 0.15 | 0 |
| Comm. F | 0.15 | 0 | 0 |
| Comm. G | 0.31 | 0 | 0 |
| Comm. E | 0.93 | 0 | 0 |

The data in Table III shows that where a small amount of free fatty acid is present, e.g. generally less than about 2 wt. percent, the dimethylformamide solvent is capable of removing substantially all the free fatty acid in one stage. With higher amounts of free fatty acid present, two stages of extraction are sufficient. In all instances, a third extraction was not necessary, because in the third contact of the soap with the dimethylformamide there was no fatty acid shown to be present in the solvent, thus indicating that there was no decomposition of the soap. Soap samples A, B, C, D, E were experimentally prepared products from octoic acids. Samples F, G, and E were commercial products prepared from similar fatty acids.

The following extractions were carried out with a conventional Büchner vacuum filter apparatus. The solvent was added to the soap sample on the porous filter plate and mixed with the soap particles for a short period, before drawing the extract away from the residual soap. After the final extraction, any residual solvent on the soap was removed by extraction with a small amount of water, after which the soap was dried.

The dimethylformamide solvent can be applied to remove any desired amount of the free organic acids using various types of apparatus. For example, the solvent can be premixed with the soap, then the mixture can be filtered with any suitable filtering apparatus. It can be applied using other kinds of extraction or filtering apparatus, including continuous filters, e.g. centrifuges. The water-insoluble free organic acids, e.g. $C_7$ and higher, can be easily separated from the dimethylformamide solvent extract by springing with water, i.e., adding water to separate the fatty acid as a separate phase which can then be decanted. The separated fatty acid and the separated aqueous dimethylformamide can be treated for recovery of the free fatty acid and anhydrous dimethylformamide. Other methods can be used for separating the lower fatty acids, e.g. acetic acid, such as distillation.

The analysis and control of free organic acids in the hydrocarbon thickening soaps is important in the production of products that are of uniform high quality. The free organic acid content of the soaps will tend to vary for a number of reasons in the production of the product. In the reaction during which the soap is precipitated insufficient reaction might be obtained, thus leaving relatively large amount of aluminum hydroxide and very little free fatty acid. This may be due to poor agitation, slow precipitation, insufficient digestion and other variables. On the other hand, the precipitated soap might have an excessively high free organic acid content which could be attributed to underwashing, hydrolysis by long standing of the soap in acidic mother liquor or for other reasons. Neither it is desirable to have too small an amount of free fatty acid present nor too large an amount. Soaps with too large amounts of free organic acid are unstable since their free fatty acid content will undergo changes by volatilization and reaction. Excessive quantities of free organic acids in the soaps makes the soaps form both weak and unstable gels when used for thickening hydrocarbon liquids.

Improvement of the soap by added free aliphatic carboxylic acids is described and claimed in an application Serial No. 617,662, filed October 22, 1956, by R. R. Leverberg and F. N. Baumgartner.

Accordingly an object achieved in the present invention resides in the use of anhydrous dimethylformamide as a selective free organic acid extracting agent since this agent does not adversely affect the soap subjected to the treatment therewith.

The following examples are given to illustrate the production of hydrocarbon thickening soaps and the utilization of the dimethylformamide solvent for removing free fatty acids from the soaps totally or to a desired extent.

*Example 1.*—Aluminum disoaps of isooctoic were prepared by the addition of aqueous aluminum sulfate solution to a solution of the sodium isooctanoate.

Using the conventional procedure, to a measured amount of distilled water, 4400 grams, a calculated amount of sodium hydroxide, 4.5 moles, and 3 moles of isooctoic acid were added. The resultant alkali metal soap solution was stirred for 10–15 minutes, then brought to the desired temperature of 35° C. A 2.18% alum solution was added at a controlled rate to the sodium soap solution, and the reaction mixture was generally stirred for about ten minutes following completion of the alum addition, i.e. after about 0.86 moles had been added. The mixture containing the precipitated crude aluminum disoap was then transferred to a filtering apparatus and washed with water. Finally, the wet cake was broken up, spread on drying trays and dried at temperatures of 120° to 180° F. until the water content of the soap was reduced to a desired amount, e.g. less than ½%. In preparing the aluminum disoaps, variations of the total free fatty acid content were obtained. The following extraction tests made with anhydrous dimethylformamide show how the free fatty acid was extracted to certain levels using for each 2 grams of soap 25 ml. anhydrous dimethylformamide portions in successive extraction stages at room temperatures in the range of 20° to 30° C.

TABLE IV

*Anhydrous dimethylformamide extraction of free fatty acids from aluminum diisooctanoate*

PERCENT FATTY ACID EXTRACTED
(AS CAPRYLIC ACID)

| Thickener Sample | Extract 1 | Extract 2 | Extract 3 | Extract 4 | Extract 5 | Extract 6 |
|---|---|---|---|---|---|---|
| A | 0.85 | 0.55 | 0.30 | 0.15 | 0.15 | 0.15 |
| B | 2.1 | 0.55 | 0.45 | 0.30 | 0.15 | 0.15 |
| C | 1.2 | 0.25 | 0.25 | 0.15 | 0.15 | 0.15 |
| D | 1.4 | 0.20 | 0.20 | 0.15 | 0.15 | 0.15 |

As shown in Table IV the extraction can be carried out with determined amounts of the solvent and number of stages to obtain a certain residual total organic acid in the soap or practically complete removal of the free organic acid.

It is to be understood that the extraction of free organic acids with the anhydrous dimethylformamide solvent can be applied to soaps made by any method but it is particularly useful when the soap product requires determination or correction of free organic acid content.

In determining the amount of free organic acid present in the thickening soap small amounts of water are added to the extracts, e.g. 10 to 40 ml. water at a 25 ml. extract and 3 to 4 drops of phenol-phthalein, as indicator, are added to the aqueous mixture which is then titrated with 0.1 N NaOH solution to an end point stable for 15–20 seconds.

It will be understood that various modifications come within the spirit and scope of the invention which is defined in the following claims.

What is claimed is:

1. The method of separating free aliphatic carboxylic acid having 2 to 36 carbon atoms per molecule from an aluminum soap that thickens hydrocarbon liquids, which comprises contacting the soap containing free aliphatic carboxylic acid with anhydrous dimethylformamide which selectively extracts the free aliphatic carboxylic acid, and separating the dimethylformamide extract of the free aliphatic carboxylic acid from the remaining soap.

2. The method as described in claim 1 wherein the soap is an aluminum disoap of a fatty acid having 7 to 18 carbon atoms per molecule.

3. The method as described in claim 1 in which the anhydrous dimethylformamide solvent is used in stages to extract substantially the total free fatty acid present in the soap without substantial hydrolysis of the soap.

4. The method of separating free aliphatic carboxylic acid having 7 to 36 carbon atoms per molecule from a metal soap which thickens hydrocarbon liquids, said soap being an aluminum disoap of the acid and the acid having low water-solubility, which comprises contacting the soap containing free aliphatic carboxylic acid with anhydrous dimethylformamide to selectively extract the free acid from the soap, separating the resulting extract of the acid from the remaining soap, and thereafter adding water to the extract to separate the extracted free aliphatic carboxylic acid from the dimethylformamide.

5. In a process of selectively extracting free fatty acid having 7 to 18 carbon atoms per molecule from a basic aluminum disoap of said acid, the improvement of using anhydrous dimethylformamide as the selective extracting solvent.

6. In the process of claim 5, the free fatty acid being 2-ethyl hexoic acid.

7. In the process of claim 5, the free fatty acid being isooctoic acid.

8. In the process of claim 5, the free fatty acid being caprylic acid.

No references cited.